April 12, 1960     M. DRUBIN ET AL     2,932,789
INSTRUMENT FOR MEASURING DYNAMIC IMPEDANCE
Filed March 13, 1958
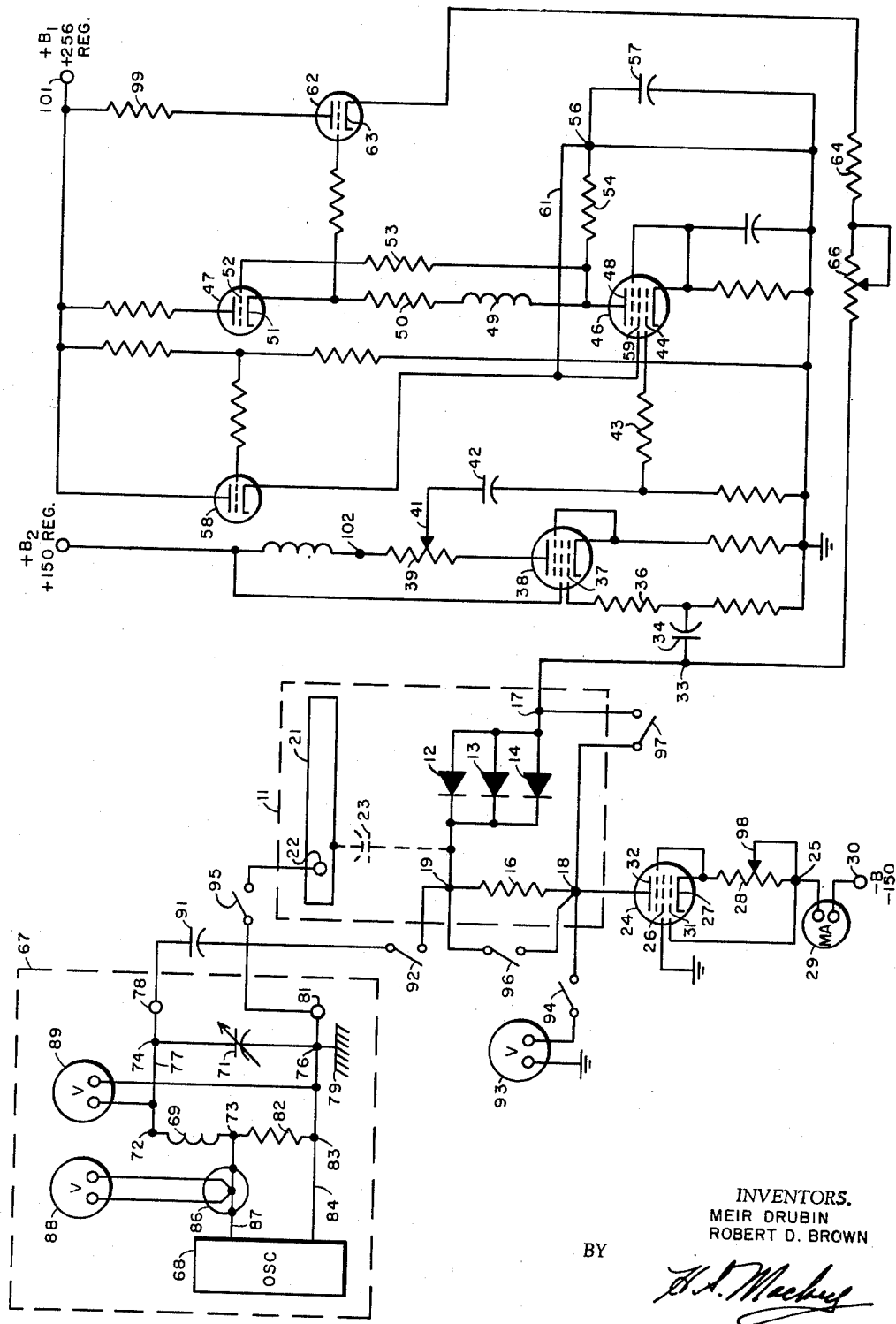
INVENTORS.
MEIR DRUBIN
ROBERT D. BROWN
BY
ATTORNEY.

United States Patent Office 2,932,789
Patented Apr. 12, 1960

2,932,789
INSTRUMENT FOR MEASURING DYNAMIC IMPEDANCE

Meir Drubin, Tarrytown, and Robert D. Brown, Ossining, N.Y., assignors to General Precision, Inc., a corporation of Delaware Application March 13, 1958, Serial No. 721,291

9 Claims. (Cl. 324—57)

This invention relates to an instrument for measuring the inductance, capacitance or resistance of an electrical component while it is in operation in a circuit.

Numerous methods are known and employed for measuring dynamic resistance and inductance; that is, measuring the resistance or inductance while the component is carrying its designed current and frequency. However, measurement of capacitance is more difficult, and presents a considerable problem when the component is a diode or transistor.

This invention solves the problem of precise measurement of the capacitance of such a device at a desired frequency while the device is carrying a desired direct current. The invention can also be employed to measure inductance or resistance at a desired frequency and direct current load.

This invention makes use of three test components: a Q-meter, a constant current generator, and an amplifier having positive feedback. These components are combined in such a way with the device to be tested that the device has the desired dynamic loading and the measurement is made at the desired frequency, while at the same time the measuring device is presented with an infinite impedance.

The Q-meter consists of an oscillator, an inductance-capacitance tank circuit, means for energizing the tank circuit by the oscillator, and a voltmeter in shunt with the tank elements. The voltmeter is calibrated in terms of Q, or coil quality factor, Q being defined by $$Q = \frac{\omega L}{R_s} \quad (1)$$

in which L is the inductance of the tank circuit coil and $R_s$ is the effective series coil resistance at the frequency $\omega$ at which the measurement is made. Such a Q-meter is fully described in U.S. Patent No. 2,337,759, issued December 28, 1953, to W. D. Loughlin.

The constant current generator comprises an electronic tube, preferably a pentode having an anode current substantially independent of changes in anode potential. The device under test is connected in series with the anode of the constant current generator which is arranged to pass a constant current through the device.

The positive feedback amplifier must have positive feedback from its output terminal to its input terminal. A preferred form consists of a first stage, resistance-capacitance coupled to a wideband series amplifier second stage, with a positive feedback path from the series stage output to the first stage input.

A preferred series amplifier stage comprises two electronic tubes with the anode of one connected to the cathode of the other. The input signal is coupled to the control grid of the former tube and the output is direct-coupled from the cathode of the latter tube. A by-pass path is provided for the control grid of the latter tube. Due to this by-pass path and in a lesser degree to other circuit arrangements this series amplifier is wideband, having a cut-off frequency in the megacycle range. Such a series amplifier is fully described in application Serial No. 677,946 of Meir Drubin filed August 13, 1957 now Patent No. 2,906,965.

As an example of a device which may be tested by the means of this invention a simple computer logic circuit is selected consisting of a plurality of semi-conductor diodes. In this example the equivalent circuit of the diodes is represented by three rectifying diodes in parallel, all in series with a resistor, the distributed capacitance being represented by a capacitor connected from the diode-resistor junction to ground.

In the operation of this invention, direct current is passed from the direct current generator through the logic circuit to the amplifier, and through it to the grounded positive potential source which supplies plate power to the tubes of the amplifier. The Q-meter is connected to the device under test at its capacitance-resistance junction. After appropriate adjustments of all components the Q-meter setting represents a quantity from which, by computation, the unknown capacitance is found. In securing the Q-meter indication an infinite impedance is presented to the Q-meter by all connected components and the accuracy of indication is therefore not affected by the dynamic operation of the device under test.

The purpose of this invention is to provide an apparatus for measuring dynamic capacitance, inductance, or resistance.

A further understanding of this invention may be secured from the detailed description and the associated single drawing figure, which is a schematic diagram of the instrument of the invention connected to a logic circuit for test.

Referring now to the drawing, the dashed rectangle 11 represents a component under test, for example a logic circuit such as is used in binary digital computers for simple arithmetic operations. Three semi-conductor diodes 12, 13 and 14 connected in parallel are schematically depicted within this logic circuit as a simple example for the purpose of explanation, although generally such circuits have many more than three diodes in a group. Resistor 16 represents the series resistance within the logic circuit but outside of the diodes. The circuit terminals 17 and 18 and the intermediate junction 19 of the paralleled diodes and the resistance are brought out as externally accessible terminals. The ground strip 21 having a terminal 22 represents the conductive frame or base of the unit or perhaps the conductive chassis of the computer of which the logic circuit is a component. In any case there will be some capacitance between each diode and this ground strip 21. The combined capacitance is represented by the dotted capacitor 23 connected between the intermediate terminal 19 and the ground strip 21.

The function of the device of this invention in this example is to measure the capacitance of capacitor 23 while the logic circuit is energized and loaded as it would be during its normal operation.

A constant-current generator 24 preferably comprises a pentode having a plate voltage vs. plate current characteristic which is nearly horizontal such as, for example, a pentode of the 6CB6 type. The screen grid 26 is connected to ground and the cathode 27 is connected through an adjustable resistor 28 and milliammeter 29 to a negative source of potential 30 which may, for example, have a value of −150 volts. This arrangement eliminates the necessity for a separate screen supply. The control grid 31 is connected to the lower end terminal 25 of resistor 28. The plate 32 is connected to the terminal 18 of device 11.

The terminal 17 of the device 11 under test is connected to the input terminal 33 of the amplifier. Signals are coupled through a capacitor 34 and a parasitic suppressing resistor 36 to the control grid 37 of a pentode 38 which comprises the first voltage amplifying stage. A plate potentiometer 39, which need have only a few hundred ohms resistance, is provided with a slider 41 and serves as the amplifier gain control. Slider 41 is coupled through capacitor 42 and parasitic-suppressing resistor 43 to the second amplifying stage control grid 44.

This second stage comprises a series amplifier having a pentode 46 and a triode 47, with the pentode anode 48 connected through an inductor 49 and resistor 50 to the triode cathode 51. The triode control grid 52 is connected through resistor 53 to the anode 48 of pentode 46, which is conventional. Wideband frequency transmission is secured by connecting a resistor 54 between anode 48 and a terminal 56 which is placed at ground potential for alternating currents by the connection of a capacitor 57 between it and ground. A triode 58 provides a low impedance potential source for the screen grid 59 to prevent motor boating and at the same time provides constant potential through conductor 61 to the terminal 56, further widening the transmission band. The output is taken from cathode 51 through cathode follower 62. This output is fed back from the cathode 63 of cathode follower 62 through fixed resistor 64 and rheostat 66 to the amplifier input terminal 33. Phases are such that this connection constitutes a positive feedback loop.

The relevant internal components of the Q-meter are depicted schematically within the dashed rectangle 67. An oscillator 68 is capable of being tuned over the frequency range of interest. A tank circuit consists of a parallel resonant oscillatory circuit basically composed of an inductance coil 69 and a continuously adjustable capacitor 71. Their terminals 72, 73, 74 and 76 are accessible and provision is made for inserting coils at terminals 72—73 of several sizes. Terminals 72 and 74 are connected by conductor 77 and constitute the high voltage tank terminal. Conductor 77 is also connected to a terminal 78 representing the high voltage output terminal of the Q-meter. Capacitor terminal 76 is connected to the Q-meter chassis 79 and to a low-voltage or ground output terminal 81.

A small resistor 82 is provided as the means of exciting the tank circuit. One terminal 83 is grounded and connected to one output conductor 84 of the oscillator 68. The other end of the resistor 82 is connected to the low-voltage coil terminal 73 and through a thermocouple assembly 86 to the other oscillator output conductor 87. A millivoltmeter 88 is connected to the thermocouple assembly 86. The millivoltmeter 88 indicates the oscillator potential impressed across calibrated resistor 82 and is calibrated in terms of a Q-multiplying factor. A second voltmeter 89 is connected between the tank high voltage conductor 77 and the ground terminal 81. This voltmeter is calibrated to indicate units of Q.

The operation of the Q-meter depends upon the fact that the voltage E induced across either the inductance or the capacitance is equal to the voltage $e$ applied to the tank circuit multiplied by the circuit Q. That is $$E = eQ \qquad (2)$$

Thus the voltmeter 89 is calibrated in terms of Q at a unit value of $e$ and the voltmeter 88 is calibrated in terms of a multiplying factor representing $e$. As is well known, the voltage across the tank circuit is maximum at resonance. Thus resonance is indicated, as capacitor 71 is tuned, by a maximum indication of Q-voltmeter 89.

In measuring the value of a capacitance by means of the Q-meter at a desired frequency the terminals 78 and 81 are first left unconnected and the oscillator 68 is set to the desired frequency. An inductance 69 is selected and inserted for measurement at the selected frequency and capacitor 71 is varied to secure maximum indication of the Q-voltmeter 89. This capacitor setting is noted. The unknown capacitor is now applied to terminals 78 and 81 in parallel with capacitor 71, which is readjusted to secure maximum Q as indicated by Q-voltmeter 89. The difference in the two settings of the capacitor 71 is taken as the value of the unknown capacitance. This measurement will, however, be incorrect if the unknown capacitance absorbs power, in effect applying parallel resistance to the tank circuit. If it does, the maximum indication of the Q-voltmeter with the unknown capacitor connected will be less than the maximum indication before connecting the capacitor. Conversely, if both Q-readings are the same the inference must be drawn that the capacitor which has been added has no measureable losses.

The Q-meter is connected to the device 11 to be tested by connecting the Q-meter ground terminal 81 to the ground terminal 22 of the device 11 through a switch 95, and by connecting the Q-meter output terminal 78 through a large capacitor 91 in a switch 92 to the intermediate terminal 19 of device 11.

Test circuit arrangements are completed by connecting a high impedance voltmeter 93 through a switch 94 to the terminal 18, by bridging terminals 18 and 19 by a switch 96 and by bridging terminals 17 and 18 by another switch 97.

Before making the determination of the capacitance of capacitor 23, current through the logic device 11 is set to the desired amount. Switches 92 and 94 are opened and switches 96 and 97 are closed. The slider 98 of adjustable resistor 28 is adjusted until the cathode current indicated by ammeter 29 is of the desired magnitude. The path of this current is from terminal 30 through ammeter 29, adjustable resistor 28, pentode 24, switch 97 (now closed), terminals 17 and 33, rheostat 66, resistor 64, cathode follower 62, and plate resistor 99 to the positive supply terminal 101. This terminal may supply a regulated positive potential of +265 volts, for example, with ground return.

In order to duplicate operating conditions of the logic device the potential of its terminal 18 relative to ground must be given a selected value. Accordingly, switch 94 is closed and the rheostat 66 is adjusted until the voltmeter 93 indicates the desired value.

The Q-meter is adjusted in preparation for test, leaving switch 92 open, by setting the oscillator 68 to the desired frequency and adjusting the tank circuit including coil 69 and condenser 71 to resonate at that frequency. The setting of the variable condenser 71 and the indication of the voltmeter 89 are noted.

The amplifier gain control slider 41 is now moved to its terminal 102, reducing amplifier gain to zero, switch 94 is opened, switch 92 is closed and switch 95 left open. Immediately the indication of Q-voltmeter 89 will fall, indicating absorption of energy from the Q-meter by the amplifier. The slider 41 is now moved away from its terminal 102, thereby increasing the amplifier gain. This causes the Q-meter indication to increase, and when the initial Q-voltmeter indication has been reached the slider 41 is left at that position. At this adjustment the Q-meter encounters infinite impedance at the amplifier input terminal 33, which since the switch 97 is closed also constitutes the output terminal of the constant current generator 24. It is evident, therefore, that the infinite impedance condition is attained by the combination of the constant-current generator and the amplifier.

The measuring apparatus has now been prepared to measure the capacitance of the equivalent capacitor 23. In order to make this measurement switch 94 remains open, switch 92 remains closed, switches 96 and 97 are opened and switch 95 is closed. The reading of Q-voltmeter 89 will now fall. Variable condenser 71 is now reduced in capacitance to restore the original Q-voltmeter indication and the new condenser setting is noted. The difference between this setting and the previous setting, in units of capacitance, is equal to the capacitance 23.

The same or similar procedures can be applied to the measurement of tube interelectrode capacitances and other capacitances under conditions of dynamic operation, that is, with the component under test carrying direct current and/or alternating current of any frequency which will not interfere with the operation of the Q-meter. The procedures and means can also be applied to measurements of dynamic inductance and dynamic resistance. In all cases the Q-meter is employed, infinite impedance is presented to the Q-meter during test, and the facilities of the Q-meter itself are made to indicate when the infinite impedance condition has been secured.

What is claimed is:

1. An instrument for measuring the dynamic capacitance of a computer logic circuit having input, output and potential supply terminals comprising, a constant current generator connected to said potential supply terminal, a loading amplifier connected to said input terminal, said loading amplifier including a positive feedback circuit connected between the output and imput thereof, a Q-meter connected to said output terminal, and means for adjusting the gain of said amplifier to a level such as to cause said constant current generator and said loading amplifier conjointly to present infinite impedance to said Q-meter and said logic circuit.

2. An instrument for measuring the dynamic capacitance of a computer logic circuit having input, output and potential supply terminals comprising, a constant direct current generator connected to said potential supply terminal, a loading amplifier connected to said input terminal, said loading amplifier including a positive feedback circuit connected between the output and input thereof, a Q-meter connected to said output terminal, switch means operative to engaged position for passing the current generated by said constant current generator directly through said feeback circuit, means in said feedback circuit for adjusting the potential impressed on said potential supply terminal, and means for adjusting the gain of said amplifier to a level such as to cause said constant current generator and said loading amplifier conjointly to present infinite impedance to said Q-meter and said logic circuit.

3. An instrument for measuring the dynamic impedance of a device having input and output end terminals comprising, a constant current generator connected to said device for applying selected normal energizing potential and current thereto, a loading amplifier having its input connected to one end terminal of said device, said loading amplifier including a positive feedback circuit connected between the output and input thereof, a Q-meter connected to the other end terminal of said device, switch means for by-passing said device and connecting said constant current generator directly to the input of said loading amplifier, and means for adjusting the gain of said amplifier for causing said constant current generator and said loading amplifier conjointly to present infinite impedance to said Q-meter.

4. An instrument for measuring the dynamic impedance of a device having input and output end terminals comprising, a constant current generator connected to said device for applying normal energizing potential and current thereto, a loading amplifier having its input connected to one end terminal of said device, said loading amplifier including a positive feedback circuit connected between the output and input thereof, a Q-meter connected to the other end terminal of said device, switch means connecting the output of said constant current generator directly to the input of said loading amplifier in one condition of operation and through said device to the input of said loading amplifier in another condition of operation, and means for adjusting the gain of said loading amplifier during the operation of said switch means to its one condition of operation for causing said constant current generator and said loading amplifier conjointly to present infinite impedance to said Q-meter.

5. An instrument for measuring the dynamic impedance of a device comprising, a constant direct current generator connected to said device for applying normal energizing potential and current thereto, a loading amplifier connected to an input terminal of said device, said loading amplifier including a positive feedback circuit connected between the output and input thereof, a Q-meter connected to an output terminal of said device, switch means directing the current generated by said constant current generator through the positive feedback circuit of said loading amplifier, and means for adjusting the gain of said loading amplifier for causing said constant current generator and said loading amplifier conjointly to present infinite impedance to said Q-meter.

6. An instrument for measuring the dynamic impedance of a device comprising, a constant direct current generator connected to said device for applying normal energizing potential and current thereto, a loading amplifier connected to an input terminal of said device, said loading amplifier including a positive feedback circuit connected between the output and imput thereof, a Q-meter connected to an output terminal of said device, switch means directing the current generated by said constant current generator directly through said positive feedback circuit in one condition of operation and through said device to the input of said amplifier in another condition of operation, and means for adjusting the gain of said load amplifier during the operation of said switch means to its one condition of operation for causing said constant current generator and said loading amplifier conjointly to present infinite impedance to said Q-meter.

7. An instrument for measuring the dynamic impedance of a device comprising, a constant direct current generator connected to said device for applying normal energizing potential and current thereto, a loading amplifier connected to an end terminal at one end of said device, said loading amplifier including a positive feedback circuit connected between the output and input thereof, a Q-meter connected to an end terminal at the opposite end of said device, switch means for establishing a circuit directly through said positive feedback circuit in its actuated condition, means in said feedback circuit for adjusting the potential applied to said device by said constant current generator, and means in said amplifier circuit for adjusting the gain thereof to a level such that said constant current generator and said loading amplifier conjointly present infinite impedance to said Q-meter and said device.

8. An instrument for measuring the dynamic impedance of a device comprising, a constant current generator, a loading amplifier including a positive feedback circuit connected between the output and input thereof, switch means connecting the output of said constant current generator directly to the input of said loading amplifier in one condition of operation and through said device to the input of said loading amplifier in another condition of operation, a Q-meter connected in shunt with that portion of the circuit of the device whose dynamic impedance is to be measured, and means for adjusting the gain of said loading amplifier during the operation of said switch means to its one condition of operation for causing said constant current generator and said loading amplifier conjointly to present infinite impedance to said Q-meter.

9. An instrument for measuring the dynamic impedance of a device comprising, a constant current generator, a loading amplifier including a positive feedback circuit connected between the output and input thereof, switch means operative in one condition for passing the current generated by said constant current generator directly through said feedback circuit in one condition of operation and through said device to the input of said loading amplifier in another condition of operation, a Q-meter connected in shunt with that portion of the circuit of the device whose dynamic impedance is to be measured, means in said feedback circuit for adjusting the potential applied to said device by said constant current generator, and means for adjusting the gain of said amplifier to a level such as to cause said constant current generator and said loading amplifier conjointly to present infinite impedance to said Q-meter and said device.

References Cited in the file of this patent
UNITED STATES PATENTS
2,481,617    Ringer ---------------- Sept. 13, 1949